(12) United States Patent
Simonin

(10) Patent No.: US 7,052,070 B1
(45) Date of Patent: May 30, 2006

(54) TAILGATE GAP FILLER

(76) Inventor: Gregory S. Simonin, 141 Winalow Dr., Roseville, CA (US) 95678

( * ) Notice: Subject to any disclaimer, the term of this patent is extended or adjusted under 35 U.S.C. 154(b) by 0 days.

(21) Appl. No.: 11/201,964

(22) Filed: Aug. 10, 2005

(51) Int. Cl.
B62D 25/00 (2006.01)

(52) U.S. Cl. .................................................. 296/57.1

(58) Field of Classification Search .............. 296/50, 296/51, 52, 53, 55, 56, 57.1, 58, 59, 60, 61, 296/62, 26.11, 106, 146.8
See application file for complete search history.

(56) References Cited

U.S. PATENT DOCUMENTS

| | | | | |
|---|---|---|---|---|
| 5,188,415 A | * | 2/1993 | Wagner | 296/57.1 |
| 5,340,184 A | * | 8/1994 | Conrado | 296/50 |
| 5,605,367 A | * | 2/1997 | McCormack | 296/57.1 |
| 6,059,344 A | * | 5/2000 | Radosevich | 296/61 |
| 6,068,327 A | * | 5/2000 | Junginger | 296/146.8 |
| 6,293,602 B1 | * | 9/2001 | Presley | 296/57.1 |
| 6,540,278 B1 | * | 4/2003 | Presley | 296/57.1 |
| 6,676,201 B1 | * | 1/2004 | Im et al. | 296/146.8 |
| 6,749,245 B1 | * | 6/2004 | Walker | 296/57.1 |

* cited by examiner

*Primary Examiner*—Lori L. Coletta
(74) *Attorney, Agent, or Firm*—Mark C. Jacobs

(57) ABSTRACT

A device for filling in the crack formed when a pickup or similar truck's tailgate is lowered from engagement with the truck bed. The device is rectilinear in cross sections, formed from a center section and two side sections, with the side sections having a bottom surface inwardly disposed cutout pattern at one end, and either a recess or insert on the interior end face for engagement with a corresponding insert or recess on the end faces of the center section. The front to back distance and the top to bottom distance are substantially equal to the dimensions of the crack where the device is intended to reside.

10 Claims, 3 Drawing Sheets

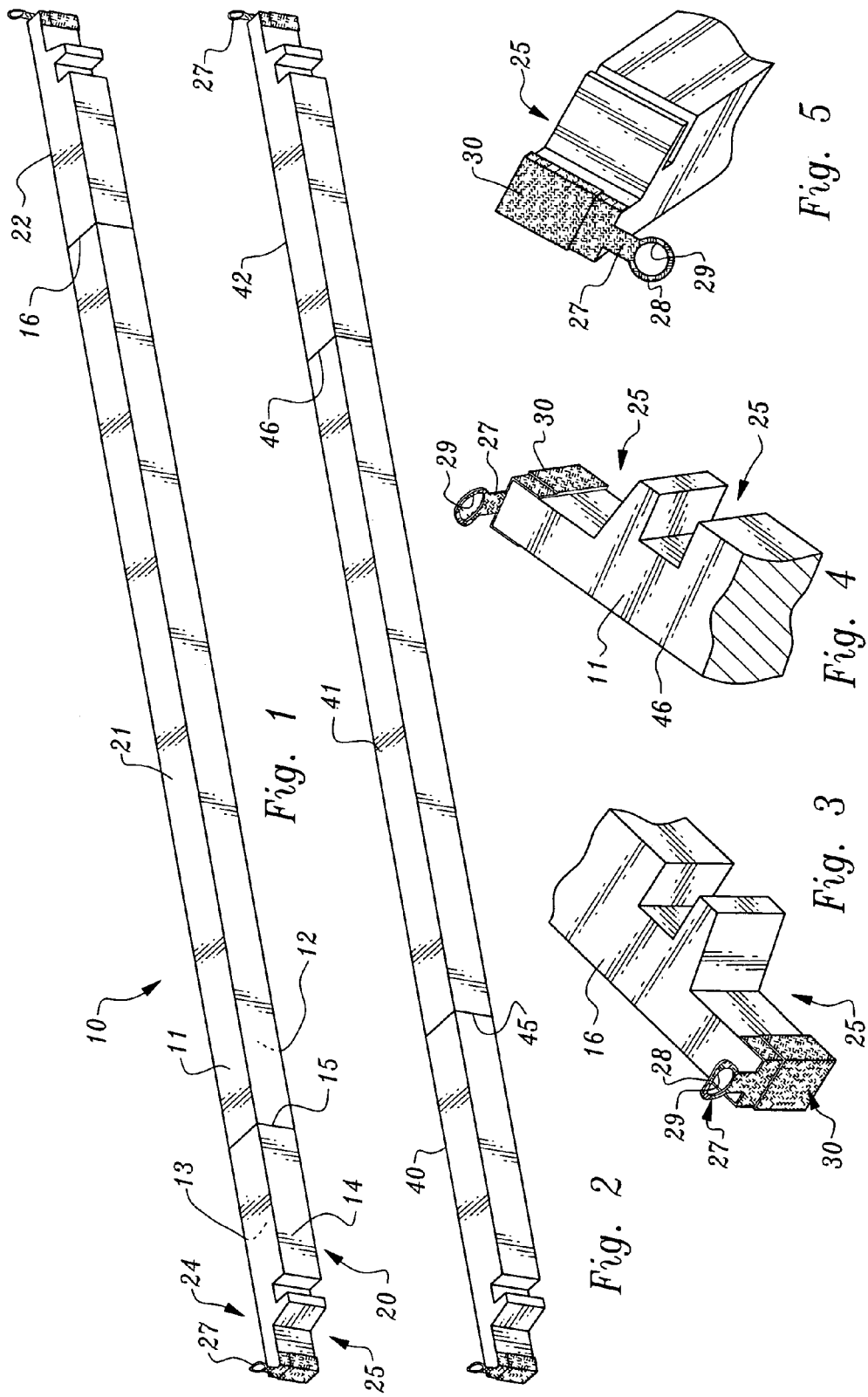

TAILGATE GAP FILLER

FIELD OF THE INVENTION

A portable device to removably fill the gap between a truck tailgate and the truck bed when the tailgate is down.

BACKGROUND OF THE INVENTION

In California, Arizona, and other western states, homeowners devote many more hours to gardening and yard work than in many other states. This fact coupled with the delight of Californians especially with the automobile and truck leads many people to combine these two interests and to use their trucks for the retrieval of plants, garden bark, mulch, topsoil, and decorative stones, large and small. Once the truck bed is loaded at the local store, with the mulch, bark stones etc., all of which collectively shall be designated as particulates, the driver returns home with the need to unload the particulates. The tailgate is lowered and the particulates are usually manually transferred by shovel to the driveway or the work locus.

Whether the transfer is by scoop, shovel, broom, wood board or any other means, it is inevitable that some of the particulates will fall into the crack between the lowered tailgate and the truck bed. The removal of these undesirables can be tedious and time consuming due to the often stoop over hand labor required to remove the stones or bark chips from the narrow slot between the tailgate and the truck bed.

Applicant having experienced this chore on more than one occasion decided to create a device that would alleviate the need to carry out the removal chore by preventing the particulates from falling into the long narrow slot between the lowered tailgate and the truck bed. Thus, this invention was born. Applicant not only solved the problem by filling in the gap, but he also went further and figured out a way to easily remove the device such that the tailgate could be returned from its horizontal and open to the vertical and closed position. The device proved successful and so applicant devised a means to reduce its size such that the device could be readily mailed or shipped such that others could enjoy his freedom from the chore of crack cleaning.

The invention accordingly comprises the device possessing the features, properties, the selection of components which are amplified in the following detailed disclosure, and the scope of the application of which will be indicated in the appended claims.

For a fuller understanding of the nature and objects of the invention, reference should be made to the following detailed description, taken in conjunction with the accompanying drawings.

BRIEF SUMMARY OF THE INVENTION

A device sized to fit the elongated crack that arises, between a truck bed and the tailgate of a pickup or similar truck, when the tailgate has been lowered. The device preferably has a center section and two opposed end sections which end sections engage the center section. The device, when assembled, by interlocking the two end pieces to the center section fills the crack to prevent entry of particulates into the crack, thereby rendering the unloading of particulated material such as topsoil, rocks, garden mulch and the like significantly less time consuming. Removal of the device can be had easily by use of the optional finger pulls, one of which is located on each of the finger pulls.

It is a first object to provide a device that fills the crack when a tailgate of a pickup or other truck is lowered to the horizontal position from a vertical position.

It is a second object to provide a device that fills the tailgate crack and does not overlie the crack.

It is a third object to provide a device that is substantially inert to most items that may be carried in the bed of a pickup or other truck.

It is a fourth object to provide t a device that fills the tailgate crack and is easily removable from that location.

It is a fifth object to provide a tailgate crack filling device that is readily storable when not in use.

Other objects of the invention will in part be obvious and will in part appear hereinafter. This invention is capable of other different embodiments and the details are capable of modifications in many respects, all without departing from the scope of the invention. Thus the drawings and the discussion are to be considered as illustrative and not as limiting.

KNOWN PRIOR ART

Applicant has not conducted a formal search on this invention but is knowledgeable of other attempts to solve the problem of successfully and easily the tailgate crack. The three attempts know to applicant include Rosenfeld, U.S. Pat. No. 5,664,822 issued in 1997; Litjenquest et al issued in 1999; and Murray U.S. Pat. No. 4,763,945. None of these patents approach the problem in the manner that applicant has. They all overlay the crack while applicant fills in the crack.

BRIEF DESCRIPTION OF FIGURES

FIG. 1 is a rear perspective view of the first embodiment of this invention.

FIG. 2 is a top perspective view of a second embodiment of this device.

FIG. 3 is a closeup rear perspective view of the left end of this device.

FIG. 4 is a top perspective view of part of the right end of the second embodiment of this device.

FIG. 5 is a left side end view of this device.

DESCRIPTION OF THE PREFERRED EMBODIMENT

Figure 6A:
FIGS. 6A and 6B show the same device in assembled and disassembled format.

In FIG. 1, the device 10 of this first embodiment is seen, with a particular cutout pattern two to be described infra. The reader is advised that the structural difference between the first and the second embodiments is merely the size of the three sections forming the device. Structurally they are the same, once assembled and as discussed infra, the cutout pattern 25 is the same.

Device 10 is seen to be formed of three sections a left section 20, a center section 21 and a right section 22 the sectional breaks or junctions being denoted by the designators 15 & 16. Seen in assembled condition the device 10 has a generally rectilinear cross section, being either square or rectangular depending on the front to back distance and the depth of the tailgate crack. The device 10 is seen to have a top surface 11, a spaced bottom surface 12, and a front surface 13 that faces the truck bed and a rear surface 14 that faces the tailgate. This first embodiment has a cut out pattern 25 that conforms to the position of the hinge or other hardware that lies within the tailgate crack 32 located between the bed 33 and the tailgate 34. See FIG. 8.

In comparison, the second embodiment differs only in the size of the three sections. In FIG. 1, there is seen a larger center section 21 and two smaller side sections 20 & 22 respectively. Here in FIG. 2, all three sections, the left 40, the center 41, being an elongated member, and the right 42 are all substantially the same in elongation. The junctions of the left to the center and the right to the center are denoted by the designators 45 & 46. The configuration in cross section, is the same, and for ease of understanding the cutout pattern 25 is the same as well as noted before the cut out pattern aspect of this invention will be discussed in detail infra.

In FIG. 3, a portion of a left section be it 20 or 40 is of no consequence as the discussion here focuses on the cutout pattern 25 of the end 24 (designated in FIG. 1) and the finger lift 27. Here a notch pattern is seen that permits the device to be set into the crack 32, per FIG. 8 without interfering with the operation of the hinges that attach the tailgate to the truck bed. The pattern seen in FIG. 3 conforms to the contents of the tailgate crack of a Chevrolet pickup for the model years, 1999–2004. Different model trucks have different configurations for the tailgate gap. Contrast the pattern appearance of the end section 20/40 of FIGS. 1 & 2 with the pattern 25ch of FIG. 9, wherein 25ch is the pattern suitable for a Chevrolet Silverado, vintage 1999 to 2004. Thus it is seen that each manufacturer has a distinct cutout pattern requirement for a particular year period for one or more models of truck. This cutout pattern is disposed inwardly from the back surface toward the front surface at the exterior end of each of both the left and right sections. The interior end faces of the left and right sections each carry an insert that is sized slightly smaller than a similarly configured recess of the center section to which the inserts are to be engaged. While it has been suggested that the same insert be used on both side sections, there is no requirement to do so. Different insert-recess combinations, make for simplified assembly.

Figure 8:
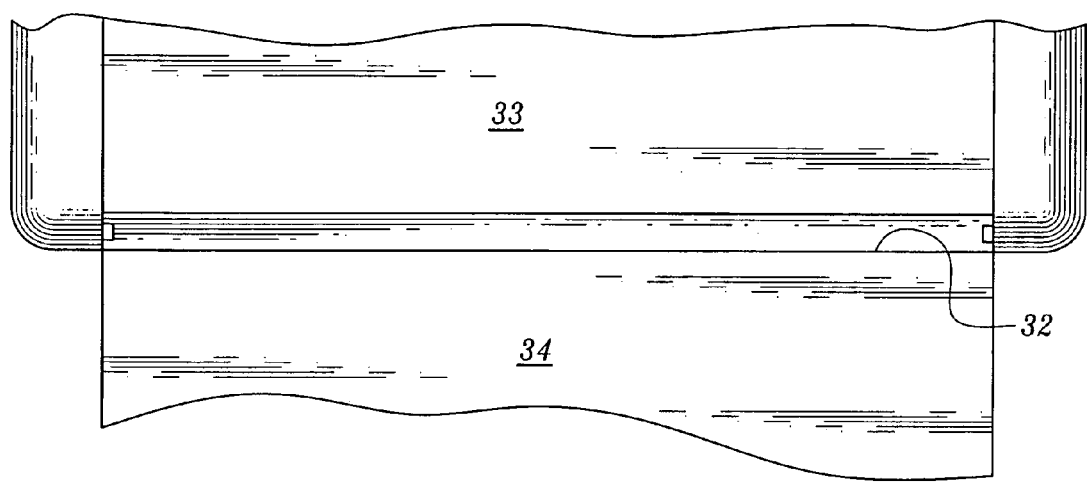
FIG. 8 is a top perspective view showing the location of the tailgate crack between a truck bed and its tailgate, when the tailgate is lowered.
Figure 9:
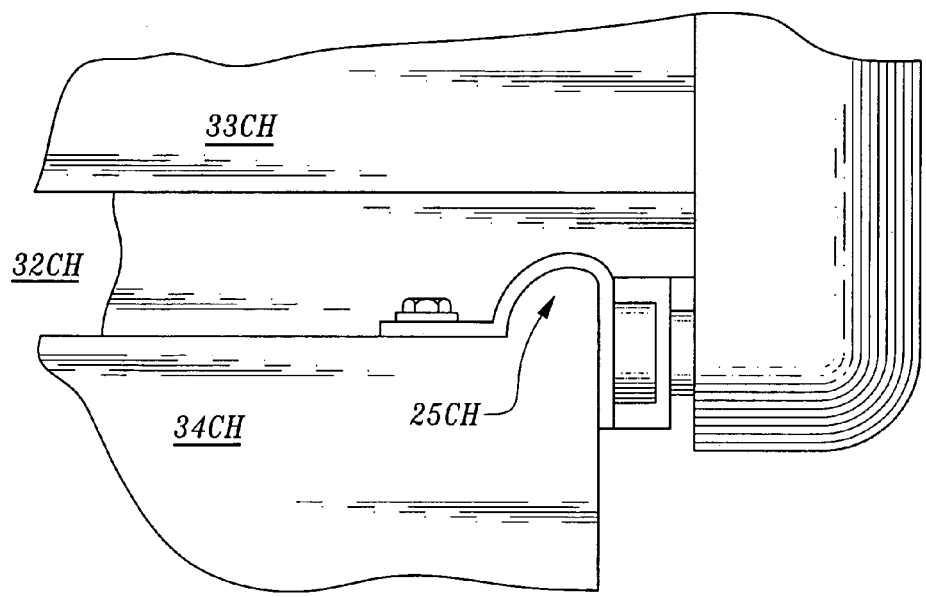
FIG. 9 depicts a variant of the two embodiments of this invention.

In order to permit the device 10 in any embodiment to fit flush and flat within a crack 32, it is necessary to conform the cutout pattern to the nuts, bolt heads, latch gear or hinges that may be visible and accessed when the tailgate 34—FIG. 8 is in the down/horizontal position for loading or emptying. Thus, the cutout pattern for the current Ford F-150 may not be the same as the cutout pattern for the previous generation of F-150. And, clearly the current F-150 would differ most probably from the cutout pattern of the current Dodge Ram or Toyota Tacoma. Thus the reader can understand that the invention herein lies not in the specific shape of the cutout pattern, but in the entire device with a cutout pattern chosen to match the specific truck model or models for which the device is intended.

The discussion returns now to FIG. 3 and the finger lift 27. This element has a mount section 30, to which is attached a finger section 28, here shown round, which finger section 28 has a finger opening 29 therein. The finger lift may be made of fabric or plastic film such as to be able to fold down out of the way, or the finger lift 27 may be rigid and made of metal. The finger lift 27 may be attached to the exterior edge 37 if the right section such as 46 shown in FIG. 4. Alternatively the finger lift may be attached to the front edge of the respective left and right sections as may be desired. Attachment of the finger lift to the right and left sections can be by any conventional means such as adhesive, nails, solvent bonding and the like, depending on the material forming the finger lift 27. The finger lift serves to permit the user to easily lift the respective section and the entire device from the tailgate crack for storage. FIG. 5 is a closeup view of a folded finger lift on a left end section. A point of caution to be noted is that if two of the same piece is to serve as both side sections, care must be taken to mount the finger lifts in opposite directions on the pair of pieces for proper orientation.

Figure 6B:
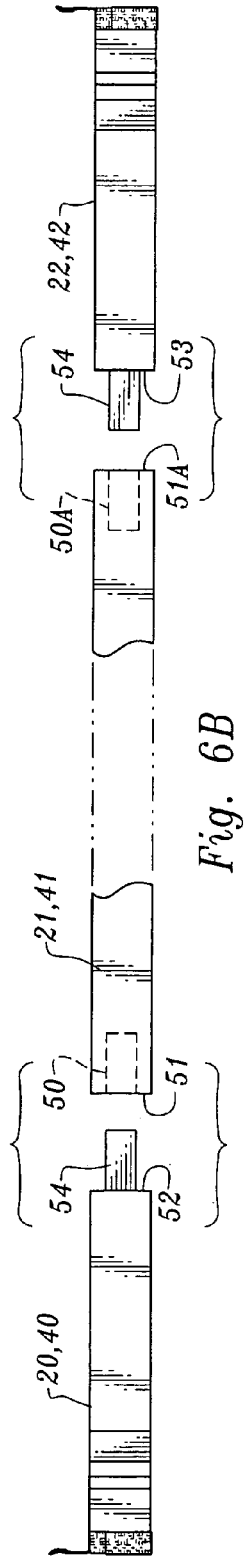

FIGS. 6A and 6B illustrate in part how the three sections are assembled together to form the device of this invention. The assembled unit is seen in FIG. 6A, while the disjointed device is shown in FIG. 6B. It is to be understood that FIG. 6B while seemingly having the respective dimensions of the embodiment of FIG. 1 is illustrative of the mode of assembly for both of the embodiments of this invention. For this reason the dual numbering of 20/40, 21/41 and 22/42 for each of the respective sections has been adopted for this figure. Thus the center section is seen to have spaced top and bottom parallel surfaces, and spaced front and rear parallel surfaces and two opposed end faces each of which end faces has a recess therein.

Figure 7B:
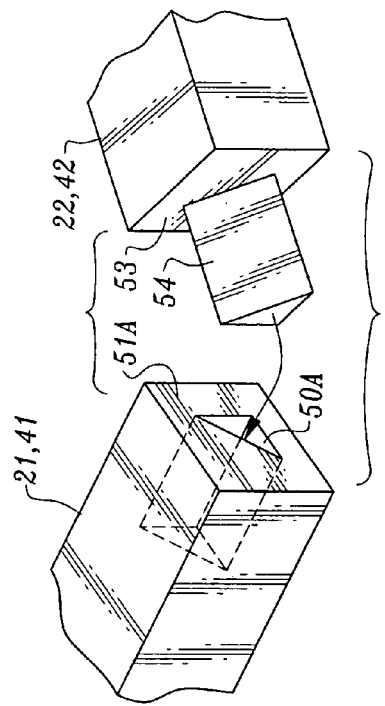
FIG. 7A and FIG. 7B are cutaway perspective views of the two inner edges of the respective left and right sections of this invention.
Figure 7A:
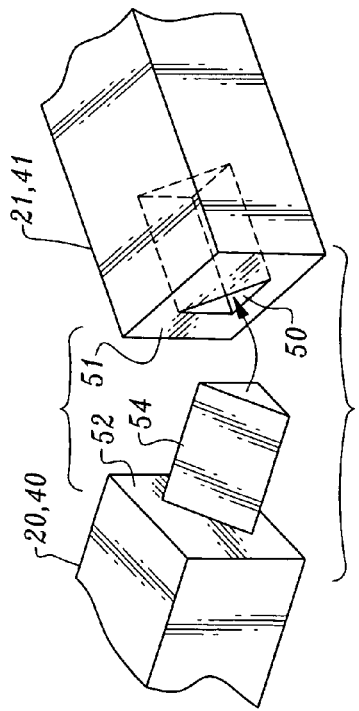

A recess denoted in dashed line designated 50 is seen on the left end face 51 of the center section, while a recess designated 50A is seen on the right end face 51A of the center section. These two recesses are seen to preferably be mirror image recesses such the same piece may serve as a right section and as a left section by a rotation of 180 degrees. Note however that such is not a requirement but merely serves to reduce cost of manufacture in that three distinct pieces need not be manufactured only two. Reference is now made to FIGS. 7A and 7B which are perspective views showing a typical triangular pattern for a section insert 54 disposed on an end face. Thus, the two recesses of the center section 50 and 50A would differ as noted by being mirror images to thus permit engagement in only one way to assemble the device.

In further detail the insert 54 is seen to be a right-angled triangle with the right angle being in the upper right corner in FIG. 7A and in the lower left corner in FIG. 7B.

While triangles have been depicted for ease and simplicity, any shape that can be mirrors imaged may serve as the insert 54 if it is desired to save manufacturing cost by using two units of one end piece reoriented to serve as both end sections. In the alternative two different recesses and two different matching inserts may be employed such as one square insert with a square recess and one round insert with a coordinated round recess respectively. The size of any recess chosen should be just slightly larger than the insert to permit a friction fit, though one that is easily disengaged. Such a selection is within the skill of the art.

As to the choice of materials, each of the sections of this device of this invention may be made of a solid material such as hard rubber, cast or molded polyurethane elastomer, polysulphone or other macro polymeric materials capable of withstanding being mishandled. The unit's three sections can also be made of a skinned foam having high tensile strength, or they may be cast solid, or molded hollow to reduce weight using suitable polymeric materials.

It is also to be understood that if desired, the devices may be reinforced by adding metallic particles or carbon black to a or rubber plastic mix for added strength. The techniques to do so are known in the art. As an alternative procedure is, a reinforcing rod may be embedded within the plastic or rubber mass along the elongation of each section, other than in the recesses, to strengthen the sections. Such procedures are also well known in the art and further discussion is unneeded.

While in the discussion above, the insert has been shown to be disposed on the left and right sections, it is also seen that the recesses could be placed in the two end sections, with the inserts protruding from the center section. See FIG. 9 wherein the end faces of the side sections are designated 150 and 151 and the two inserts are designated 154. In such a situation the two side sections can be made as one cast part by reorienting the unit to serve as the second side. See supra discussion.

As to sizing of the device, it is seen that the device has a top to bottom elevation that substantially matches the elevation of the tailgate of the truck model for which it is intended and a front to back thickness that is slightly smaller than the width of the tailgate crack of the truck model for which the device is intended.

The primary reason to assemble the device on sight at the location of use, is to save on shipping costs, as United Parcel Service and other carriers charge more for excessively long items shipped in nonstandard packing. Such a construction also is an aide to retailers who have standard storage facilities and shelf space.

While finger lifts have been shown disposed on both side sections, these are optional and only one side section may have one if such is desired, to reduce manufacturing costs.

Since certain changes may be made in the described apparatus without departing from the scope of the invention herein involved, it is intended that all matter contained in the above description and shown in the accompanying drawings shall be interpreted as illustrative and not in a limiting sense.

I claim:

1. A device for filling the crack that forms in a pickup truck or other vehicle when the attached tailgate is lowered from a vertical position to a horizontal position, which crack filler comprises:
   a device having three sections, two of which may be mirror images, which three sections are a left section, a center section and a right section, the center section being an elongated member of a rectilinear cross section, having a front, back and top and bottom surfaces, and two end faces, each of which end faces has a recess therein configured to receive a similarly configured insert,
   the left and right sections, also being of a generally rectilinear cross section, and having a cutout pattern at the exterior end thereof, and an insert at the interior end thereof outwardly disposed and configured to be received by a recess of the center section for the engagement therewith;
   said device having a top to bottom elevation that substantially matches the elevation of the tailgate of the truck model for which it is intended and a front to back thickness that is slightly smaller than the width of the tailgate crack of the truck model for which the device is intended.

2. A device for filling the crack that forms in a pickup truck or other vehicle when the attached tailgate is lowered from a vertical position to a horizontal position, which crack filler comprises:
   a device having three sections, two of which may be mirror images, which three sections are a left section, a center section and a right section, the center section being an elongated member of a rectilinear cross section, having a front, back and top and bottom surfaces, and two end faces, each of which end faces has an outward extending insert thereon for engagement with a recess of similar configuration;
   the left and right sections, also being of a generally rectilinear cross section, and having a cutout pattern at the exterior end thereof, and a recess at the interior end thereof and configured to receive an insert of the center section for the engagement therewith;
   said device having a top to bottom elevation that substantially matches the elevation of the tailgate of the truck model for which it is intended and a front to back thickness that is slightly smaller than the width of the tailgate crack of the truck model for which the device is intended.

3. The device of claim 1 wherein the left and right sections are both the same piece, one of which is merely reoriented.

4. The device of claim 2 wherein the left and right sections are both the same piece, one of which is merely reoriented.

5. The device of claim 1 wherein both end sections have an insert that is triangular and the opposed recesses are mirror images to permit two of the same piece to serve as the left and right sections.

6. The device of claim 1 wherein each pair of insert and corresponding recess is different for the left and the right side sections.

7. The device of claim 1 wherein the device is made of hard rubber.

8. The device of claim 2 further including a finger lift disposed on at least one side section at the exterior end thereof to assist in the removal of the device from a tailgate crack.

9. The device of claim 1 further including a finger lift disposed on at least one side section at the exterior end thereof to assist in the removal of the device from a tailgate crack.

10. The device of claim 9 wherein finger lifts are disposed on both side sections.

* * * * *